United States Patent Office 3,557,058
Patented Jan. 19, 1971

3,557,058
PROCESS FOR OBTAINING POLYOXYMETHYLENES HAVING CONTROLLED MOLECULAR WEIGHT AND PRODUCTS OBTAINED THEREFROM
Leonardo Fiore and Giorgio Nissim, Milan, and Elio Crespi, Busto Arsizio, Italy, assignors to Montecatini Edison S.p.A., Milan, Italy, a corporation of Italy
No Drawing. Filed Apr. 16, 1968, Ser. No. 721,578
Claims priority, application Italy, Apr. 19, 1967, 15,109/67, 795,982/67
Int. Cl. C08g *1/04, 1/22*
U.S. Cl. 260—67
6 Claims

ABSTRACT OF THE DISCLOSURE

Modified oxymethylene homopolymers and copolymers having particular terminal groups and characterized by controlled molecular weight and increased thermal stability are obtained by polymerizing trioxane or mixtures thereof with other monomers in the presence of particular chain-transfer agents.

THE PRIOR ART

As is known, the polyoxymethylenes are polymers the chain of which consists of —$CH_2O$— units. The polymers may be produced by polymerizing trioxane in the presence of a cationic catalyst. The polymers thus obtained show hemiacetalic end-groups which, due to the instability thereof at high temperatures, cause degradation of the polymeric chain and formation of formaldehyde monomer. Said degradation is due to a depolymerization starting from the chain ends (unzippering). It has been proposed to improve the thermal stability of the polyoxymethylenes by copolymerizing the trioxane with compounds which result in the introduction into the chain of (—$CH_2$—)$_n$ groups, wherein $n$ is a whole number equal to or greater than 2. These groups serve to halt the degradation of the chain. Such trioxane copolymers normally comprise a fraction which is unstable at high temperatures, due to the presence of unstable hemiacetalic terminal groups. When the unstable fraction is removed, there remain copolymers terminating in groups introduced by means of the comonomers, and which exhibit increased thermal stability. It is quite clear, then, that it is useful that the unstable fraction of the trioxane copolymers be as low as possible.

The oxymethylene copolymers are used as thermoplastic materials by known processing methods, such as by extrusion, injection molding, blow-molding, spinning, etc., depending on the intrinsic characteristics of the copolymers which characteristics are for the most part closely related to the molecular complexity of the copolymers. Furthermore, it is also known that by increasing the molecular weight of the copolymers above a certain limit, the workability of the polyoxymethylenes is affected adversely and, therefore, the usefulness of the thermoplastic materials is reduced.

THE PRESENT INVENTION

The object of this invention is to provide a process for producing thermally stable trioxane polymers and copolymers having a desired molecular weight which can be readily controlled and predetermined.

This and other objects are achieved according to this invention by polymerizing or copolymerizing trioxane in contact with a cationic catalyst of the Lewis acid type and with specific substances which function as chain-transfer agents and molecular weight regulators.

We have found that it is possible to obtain, readily, the thermally stable trioxane homopolymers or copolymers of the desired, predetermined molecular weight by simply varying the concentration of the chain-transfer agent in the starting mixture comprising the trioxane or mixtures thereof with other monomers copolymerizable therewith and catalyst.

Cationic catalysts of the Lewis acid type and containing halogen atoms are used in the present process. Examples of such catalysts include $BF_3$; $FeCl_3$; $SnC_4$; $PCl_5$; $SbCl_5$; etc. The presently preferred catalysts are $FeCl_3$ and $BF_3$, alone or complexed with suitable complexing agents, for instance the complexes $BF_3 \cdot (C_2H_5)_2O$ and $BF_3 \cdot (CH_3)_2S$.

The catalyst is used in amounts between 0.0001% and 0.1% by weight, preferably between 0.001% and 0.01% by weight, based on the trioxane weight.

The useful chain-transfer agents which act as molecular weight regulators have the general formula T—(OR)$_n$ wherein T is an oxygen-containing heterocyclic radical, the ring of which is formed by 5 to 8 atoms and contains from 1 to 3 oxygen atoms and may carry halogen-substituents or alkyl substituents having from 1 to 4 carbon atoms, R is a hydrocarbyl selected from the group comprising alkyls, cycloalkyls and aryls, having from 1 to 8 carbon atoms, and the OR group is in an alpha-position with respect to the oxygen atom of the ring, and wherein $n$ is a whole number varying from 1 up to double the number of oxygens present in the ring.

The chain-transfer agents used according to this invention are for example: the mono- and dialkoxytetrahydrofuranes, the mono- and dialkoxy-tetrahydropyranes, the mono-, di-, tri- and tetraalkoxydioxanes, the mono-, di-, tri- and tetraalkoxytrioxyepanes and the mono-, di-, tri- and tetraalkoxytrioxyocanes.

The chain-transfer agent is used in amounts varying between 0.01% and 10% by moles on trioxane, preferably between 0.05% and 5%, depending on the molecular weight desired for the polymer to be produced. The molecular weight decreases with increase in the concentration of the chain-transfer agent.

All these compounds, acting by the same mechanism as chain-transfers, improve also the thermal stability of the polymers and copolymers of the trioxane, inasmuch as they modify most of the thermally unstable acetalic hydroxy terminal groups, by transforming said groups into stable ethereal groups, probably according to the following scheme, wherein T—OR represents the molecular weight regulator:

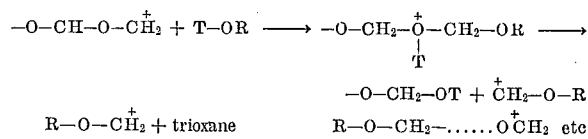

The thermal stability of the homopolymers of trioxane produced according to this invention increased considerably, while the copolymers thereof have a very low content of unstable fractions.

The trioxane used herein must be substantially anhydrous. As comonomers, various ethers or cyclic acetals may be used, such as ethyleneoxide, 1,3-dioxolane, 1,3,5-trioxyepane, 1,3 - dioxane, trimethyleneoxide, 1,2-propyleneoxide, 1,2-butyleneoxide, pentamethyleneoxide, neopentylformal, tetrahydrofurane, trioxabicyclodecane, hexahydrobenzo-1,3,5-trioxyepane, etc.

The polymerization may be carried out either as a bulk reaction or in solution in a suitable solvent, which may be a hydrocarbon, such as benzene or cyclohexane, a chloroalkane, such as methylene chloride, or a nitroarene, such as nitrobenzene. The reaction may be carried out batchwise, for example in an autoclave, or on a continuous scale, for example in a screw mixer. The temperature is comprised between 30° and 120° C., preferably between 50° and 90° C.

In the examples, the inherent viscosity is to be considered as an index of the average molecular weight of the polymers. The inherent viscosity is defined as:

$$\eta_{inh} = \frac{\ln \eta_{rel}}{c}$$

wherein $c$ is the concentration of the dissolved substance expressed in g./100 cc. of solvent and $$\eta_{rel} = \frac{\eta \text{ solution}}{\eta \text{ solvent}}$$

The relative viscosity ($\eta_{rel}$) is measured at 150° C., using a solution of 0.5 g. of polymer in 100 cc. of dimethylformamide containing 1% of diphenylamine as antioxidant. The relationship between viscosity and molecular weight is described in the technical literature such as, for example, H. Mark, J.A.C.S., vol. 65, 2319 (1943); R. Houwink, J. Practical Chemistry, vol. 157, 15 (1940); and Bel' Govskimm, I.M., I.S. Enikolopyan et L.S. Sakhonenko, Vysokomolek. Soed, vol. 4, 1197 (1962).

The following examples are given for illustrative purposes and shall not be taken as limiting the scope of the invention.

Examples 1–9

The tests were carried out according to the following procedures:

Anhydrous trioxane (50 g.) and varying amounts of different chain-transfer agents were placed in glass vials. The vials were purged with nitrogen, hermetically sealed, and dipped into a thermostatic bath at 75° C. and kept there until complete melting of the trioxane was attained. Thereupon 0.3 g. of a solution of 1% of $BF_3 \cdot (C_2H_5)_2O$ in anhydrous nitrobenzene were injected, the vials then being vigorously agitated and kept for one hour at 75° C. After a few seconds, the mass of the reactants solidified.

At the completion of the test, the product was poured into methanol containing 1–2% of ammonia; it was then filtered, ground into fine powder, washed with boiling water and acetone and finally dried in an oven at 50° C., under vacuum.

A sample (0.3 g.) of the obtained polymer was melted and kept for 20 minutes under vacuum at 222° C. This treatment removed the thermally unstable fraction, whose value $$\frac{\Delta P}{P}$$

was determined by weighing and was expressed as loss in weight percent on the polymer. On the remaining stable fraction the thermal stability ($K_{222}$) was determined and expressed as loss in weight percent and for each minute of treatment at 222° C.

In the following table are summarized the data of the various tests.

The cited compounds have the following structures:

2,3-dimethoxy-1,4-dioxane 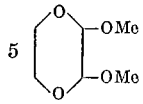

2,3-diethoxy-1,4-dioxane 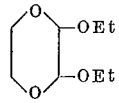

2-ethoxy-tetrahydropyrane 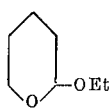

2-methoxy-3-chloro-tetrahydrofurane 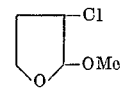

Example 10

Following the same procedures as was used in the proceeding examples, 50 g. of trioxane and 2.4 g. of 2,4,8-trioxabicyclo[4,4,0]decane were copolymerized in the presence of 0.1 g. of 2,3-dimethoxy-1,4-dioxane. Thereby, 43 g. of copolymer were obtained having an $\eta_{inh}=0.60$ and an unstable fraction of 5.5%. The stable fraction showed a $K_{222}=0.02\%$/minute.

For comparative purposes, a second copolymerization was carried out under the same conditions but in the absence of a chain transfer agent. The polymer thus obtained had an $\eta_{inh}=1.1$, which could be too high for some technological processing such as for instance injection molding. The unstable fraction was 10%.

Examples 11–15

By following the same procedures as those used in the preceding examples, mixtures of 50 g. of trioxane with 2 g. of 1,3-dioxolane were copolymerized in the presence of varying amounts of 2,3-dimethoxy-1,4-dioxane (DMD). The results obtained are tabulated in the following Table II:

TABLE II

| Example: | DMD, grams | Polymer obtained, grams | $\eta_{inh}$. | $\frac{\Delta P}{P}$ percent | $K_{222}$, percent/minute |
|---|---|---|---|---|---|
| 11 | 0 | 44.5 | 0.90 | 5.5 | 0.02 |
| 12 | 0.05 | 44.5 | 0.75 | 4.0 | 0.02 |
| 13 | 0.1 | 44.0 | 0.61 | 3.6 | 0.02 |
| 14 | 0.2 | 45.0 | 0.51 | 3.0 | 0.01 |
| 15 | 0.3 | 44.0 | 0.39 | 3.0 | 0.02 |

The present invention encompasses, also, the new oxymethylene homopolymers and copolymers obtained by the processes described herein. Such homopolymers and copolymers distinguish over oxymethylene homopolymers and copolymers of the prior art in that chains of these polymers have terminal groups derived from the particular chain-transfer agents used and which impart the improved thermal stability to the polymers.

These thermally stable homopolymers and copolymers are useful as plastic materials and can be used in the manufacture of articles such as films, sheets, filaments and

TABLE I

| | Transfer | | Polymer obtained, grams | $\eta_{inh}$. | $\frac{\Delta P}{P}$ percent | $K_{222}$, percent/minute |
|---|---|---|---|---|---|---|
| | Type | Weight, grams | | | | |
| Ex.: | | | | | | |
| 1 | | | 46 | 0.80 | 51.8 | 0.5 |
| 2 | 2,3-dimethoxy-1,4-dioxane | 0.1 | 46.7 | 0.58 | 10.3 | 0.06 |
| 3 | do | 0.5 | 45.1 | 0.36 | 9.9 | 0.02 |
| 4 | do | 1 | 49 | 0.25 | 5.2 | 0.02 |
| 5 | do | 5 | 48 | 0.08 | 5.0 | 0 |
| 6 | 2,3-diethoxy-1,4-dioxane | 1.5 | 42 | 0.15 | 4.5 | 0.02 |
| 7 | do | 3 | 39 | 0.10 | 3.0 | 0.02 |
| 8 | 2-ethoxytetrahydropyrane | 0.5 | 42 | 0.20 | 40.0 | 0.01 |
| 9 | 2-methoxy-3-chlorotetrahydrofurane | 2.2 | 46 | 0.16 | 6.5 | 0.1 | fibers by shaping a mass comprising the homopolymers or copolymers by known methods for obtaining shaped articles of the type mentioned from a plastic mass comprising the same.

As will be apparent, changes and variations can be made in detail in practicing the invention, without departing from the spirit thereof. Therefore, we intend to include in the scope of the appended claims all such modifications as will be obvious to those skilled in the art from the description and working examples given herein.

What we claim is:

1. A process for the preparation of modified oxymethylene homopolymers and copolymers having particular terminal groups, controlled molecular weight and improved thermal stability, which comprises polymerizing trioxane and mixtures thereof with monomers copolymerizable therewith and selected from the group consisting of ethylene oxide, 1,3,-dioxolane, 1,3,5-trioxyepane, 1,3-dioxane, trimethyleneoxide, 1,2-propyleneoxide, 1,2-butyleneoxide, pentamethyleneoxide, neopentylformal, tetrahydrofuran, trioxabicyclodecane, and hexahydrobenzo-1,3,5-trioxyepane, in contact with a cationic catalyst of the Lewis acid type containing halogen, at temperatures comprising between 30° C. and 120° C., and in contact with a chain transfer agent acting as a modifer of the hydroxy terminal group of the chain formed in the reaction and as a molecular weight regulator, in amounts of from 0.01 mole to 10 moles per 100 moles of the trioxane, said chain transfer agent having the general formula $$T(OR)_n$$

wherein T is an oxygen-containing heterocyclic radical selected from the group consisting of tetrahydrofuran, tetrahydropyrane, dioxane, trioxyepane and trioxyocane, halogen-substituted derivatives of said radicals and alkyl-substituted derivatives of said radicals containing 1 to 4 carbon atoms in the alkyl groups, R is a hydrocarbyl selected from the group consisting of alkyl, cycloalkyl, and aryl radicals containing from 1 to 8 carbon atoms, the OR group is in alpha-position with respect to the oxygen of the ring, and $n$ is a whole number from 1 to double the number of oxygen atoms present in the ring.

2. The process according to claim 1, characterized in that the chain-transfer agent is a dialkoxytetrahydrofurane.

3. The process according to claim 1, characterized in that the chain transfer agent is a dialkoxytetrahydropyrane.

4. The process according to claim 1, characterized in that the chain transfer agent is a dialkoxydioxane.

5. The process according to claim 1, characterized in that the chain transfer agent is a monoalkoxymonochlorotetrahydrofurane.

6. The process according to claim 1, characterized in that the chain transfer is a monoalkoxytetrahydropyrane.

References Cited

UNITED STATES PATENTS

| | | | |
|---|---|---|---|
| 3,087,913 | 4/1963 | Kray et al. | 260—73 |
| 3,337,503 | 8/1967 | Schnizer et al. | 260—67 |
| 3,346,663 | 10/1967 | Kern et al. | 260—823 |

WILLIAM H. SHORT, Primary Examiner

L. M. PHYNES, Assistant Examiner

UNITED STATES PATENT OFFICE
CERTIFICATE OF CORRECTION

Patent No. 3,557,058        Dated January 19, 1971

Inventor(s) Leonardo Fiore et al

It is certified that error appears in the above-identified patent and that said Letters Patent are hereby corrected as shown below:

Col. 2, line 8, $SnC_4$ should read - - -$SnCl_4$ - - -.

Signed and sealed this 6th day of August 1974

(SEAL)
Attest:

McCOY M. GIBSON, JR.        C. MARSHALL DANN
Attesting Officer            Commissioner of Patents